(12) United States Patent  
Yamagata et al.

(10) Patent No.: US 6,985,677 B2  
(45) Date of Patent: Jan. 10, 2006

(54) IMAGE FORMATION APPARATUS

(75) Inventors: Masanori Yamagata, Shizuoka (JP); Tomohide Katsumata, Shizuoka (JP); Seiji Yokoyama, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/817,872

(22) Filed: Apr. 6, 2004

(65) Prior Publication Data

US 2004/0197108 A1    Oct. 7, 2004

(30) Foreign Application Priority Data

Apr. 7, 2003    (JP) .............................. 2003-103216

(51) Int. Cl.  
*G03G 15/00* (2006.01)  
*G03G 15/20* (2006.01)

(52) U.S. Cl. ............................ 399/18; 399/22; 399/92
(58) Field of Classification Search ................ 399/18, 399/21, 22, 69, 70, 91, 92  
See application file for complete search history.

(56) References Cited

U.S. PATENT DOCUMENTS

| | | | |
|---|---|---|---|
| 5,208,612 A | 5/1993 | Obu et al. ............... | 346/153.1 |
| 6,283,590 B1 * | 9/2001 | Peter ........................ | 347/102 |
| 6,374,063 B1 | 4/2002 | Todome .................... | 399/18 |
| 6,539,185 B2 * | 3/2003 | Hanyu et al. ............. | 399/67 |

FOREIGN PATENT DOCUMENTS

| | | |
|---|---|---|
| EP | 1 220 053 A2 | 7/2002 |
| JP | 9-62153 | 3/1997 |
| JP | 11-190924 | 7/1999 |
| JP | 11-202737 | 7/1999 |
| JP | 2998819 | 11/1999 |
| JP | 2000-7205 | 1/2000 |
| JP | 2000-305325 | 11/2000 |
| JP | 2001-5366 | 1/2001 |
| JP | 2002-132122 | 5/2002 |
| JP | 2002-357990 | 12/2002 |

* cited by examiner

*Primary Examiner*—Ren Yan  
(74) *Attorney, Agent, or Firm*—Fitzpatrick, Cella, Harper & Scinto

(57) ABSTRACT

The image formation apparatus has a plurality of cooling fans inside the main body of the apparatus and comprises an error detecting function of detecting occurrence of an error such as a sheet jam, and switches between operation and non-operation of the cooling fans or changes a rotation number thereof in operation according to a form of a detected error. Thus, it allows optimization of in-apparatus the temperature in the apparatus control on error occurrence and temperature control of each inside portion of the apparatus on sheet jam occurrence so as to solve various problems relating to in the apparatus temperature status on the error occurrence.

16 Claims, 3 Drawing Sheets

IMAGE FORMATION APPARATUS

BACKGROUND OF THE INVENTION

1. Field of the Invention

The present invention relates to control of cooling means placed inside an image formation apparatus proper.

2. Related Background Art

A cooling fan is placed in the proximity of an image heating and fixing apparatus mounted on an image formation apparatus such as an electrophotographic copying machine or a printer to prevent temperature rise inside the apparatus proper due to heat of the fixing apparatus. The cooling fan efficiently exhausts hot air generated by the fixing apparatus to the outside of the main body of the image forming apparatus so as to prevent an adverse thermal effect on image formation by keeping heated air from flowing into a so-called image formation portion.

As for such an image formation apparatus, efforts have been made to design it in a form in which there are minimum gaps among components and devices in order to meet miniaturization needs. As a result thereof, there are many cases where other components and devices such as a transfer belt and a developing device must be placed in the proximity of the fixing apparatus which is a heating element.

Concerning such an image formation apparatus, to prevent a problem that the heat generated by the fixing apparatus has an adverse effect on surrounding components, there is a technique which has been very commonly employed, wherein the cooling fan is usually provided inside the image formation apparatus and the hot air generated by the fixing apparatus is efficiently exhausted to the outside of the main body of the image forming apparatus so as to prevent the adverse thermal effect on each portion.

In the case of the image formation apparatus having such a configuration, a control temperature of the fixing apparatus when the main body of the apparatus is on standby is different from that during actual printing operation. And there are many cases where the former temperature is set lower than the latter.

In conjunction with this, control is exerted to switch a rotation number (rotational speed) of the cooling fan provided inside the main body of the apparatus to have different speeds between on standby and during the actual printing operation of the main body of the apparatus. In general, it is often controlled to be at a slower rotation number on standby than during the actual printing operation.

In the case where an error including a sheet jam occurs during the printing in the image formation apparatus, it is common that the actual printing operation thereof is stopped in emergency, energization to a heater of the fixing apparatus is turned off, and the rotation number of the cooling fan is switched to the same rotation number as that on standby (Japanese Patent Application Laid-Open No. 2000-007205 and Japanese Patent Application Laid-Open No. 2001-005366 for instance).

Jam handling is performed by opening a release door of the image formation apparatus and opening the inside thereof (Japanese Patent Application Laid-Open No. 11-190924 for instance). A power circuit is automatically cut off by opening the release door so as to secure electrical safety of a user performing the jam handling. Therefore, as described above, driving of the cooling fan switched to the same rotation number as that on standby also stops on cutting off the power circuit by opening the release door.

The following problem arises, however, in the case of thus keeping the rotation number of the cooling fan in all error statuses constant.

For instance, in the case where a sheet stays in the proximity of the fixing apparatus and causes a jam, the energization to the heater of the fixing apparatus is off but the temperature of the fixing apparatus is still high when the user handles the jam. For that reason, it is not easy to handle it due to the heat diffused from the fixing apparatus. Therefore, it is desirable to cool this portion as efficiently as possible during the time from stopping the operation of the image formation apparatus in emergency due to jam detection until having the power circuit cut off by opening the release door for the jam handling. And it is desirable to rotate the fans placed in the proximity of the fixing apparatus, for instance, at a faster speed than usual during the time.

In the case where the sheet stays at a location other than the proximity of the fixing apparatus and causes the jam, however, there is a problem that, if the same fan control as previously described is performed, the fixing apparatus itself is quenched, and if the user tries to restart the printing operation after performing the jam handling, it takes time for the fixing apparatus once cooled to reach a target control temperature, leading to a complaint of extended wait time.

Even in the case of the jam in the proximity of the fixing apparatus likewise, a desirable cooling speed may be different between the case of a regular sheet and the case of an OHT film.

For instance, there is a problem that, if a certain type of OHT film causes the jam in the proximity of the fixing apparatus and is left at a high temperature, it drastically gets soft and deformed, and hardens again in that form if left at an ordinary temperature so that the jam handling becomes very difficult.

Therefore, it is necessary, in the case of the jam with such a film, to maximize the rotation number of the cooling fan and quench it.

To be more specific, it is desirable to allow adequate control of the cooling fan according to the forms, that is, what kind of jam occurred and what kind of error occurred in the apparatus proper respectively.

SUMMARY OF THE INVENTION

The purpose of the present invention is made in order to solve such problems, and an object thereof is to allow optimization of the temperature control in the image forming apparatus on error occurrence and temperature control of each inside portion of the apparatus on sheet jam occurrence and become capable of solving various problems relating to the temperature status in the image forming apparatus on the error occurrence.

Another purpose of the present invention is to provide an image formation apparatus having a plurality of cooling fans inside the apparatus proper and comprising an error detection function for detecting occurrence of errors in a plurality of forms including the sheet jam, wherein the apparatus has means for switching between operation and non-operation of the cooling fans or changing a rotation number (rotational speed) in operation according to the form of the detected error.

As for switching between the operation and non-operation of the cooling fans according to the form of the detected error, a second cooling fan 61 always has its rotation turned off in the case where a fixing temperature controller is turned off due to a jam as with the control of the second and third cooling fans 61 and 62 in Table 1 for instance. However, it is rotated at a maximum speed (3500 rpm in this case) in an error status on a runaway of the fixing temperature controller. It is intended to promptly resolve a thermal effect on the proximity of an imaging unit. The third cooling fans 62 is turned off in the case of the jam other than a double-sided print unit, but is rotated in the case of the jam inside the double-sided print unit. It is also turned off on the runaway of the fixing temperature controller.

It is suitable, in the case where the sheet jam or another error occurs inside the main body of the apparatus, to have means for detecting a position of residual sheets in a conveyance route inside the main body of the apparatus and also have means for switching between the operation and non-operation of all of the plurality of cooling fans or a specific cooling fan inside the main body of the apparatus based on positional information on the residual sheets. It should also have means for switching the rotation number of the cooling fans in operation.

As for a control mode for switching between the operation and non-operation of all the plurality of cooling fans or the specific cooling fan inside the main body of the apparatus based on the positional information on the residual sheets, a situation in which all the fans are turned off is thinkable in the case where, for instance, they must be completely powered off for safety due to an abnormality of the apparatus.

It is suitable to have detecting means for detecting that the sheet which stayed due to the sheet jam inside the main body of the apparatus has been removed. And based on the information from the detecting means, control means returns rotation control of the cooling fans from a control status of the main body of the apparatus on the error occurrence to the same control status as a standby status or a printing status at a normal time.

It is suitable to have a fixing apparatus for getting heated while supporting the sheet and have means for detecting the occurrence of the sheet jam in the proximity of the fixing apparatus inside the apparatus proper. And in the case where the sheet jam or sheet stay in the proximity of the fixing apparatus is recognized by the detecting means, it switches the specific cooling fan inside the main body of the apparatus from a stopped status to an operating status or switches it to a speed faster than the rotation number on standby or on printing of the main body of the apparatus so as to rotate it.

As for the control mode for switching the specific cooling fan inside the main body of the apparatus from the stopped status to the operating status in the case where it recognizes the occurrence of the sheet jam or sheet stay in the proximity of the fixing apparatus, it should be in the form in which, in the case of a system having no particular problem as to the in-apparatus temperature even if a first cooling fan 60 usually has its rotation turned off both on standby and on printing for instance, it is rotated only in the case of a fixing portion jam. To be more specific, it is the case where the cooling fan 60 in Table 1 is off except on the jam in the proximity of the fixing apparatus (and a temperature control error).

It is suitable to return the cooling fan to the operating status before the error occurrence on detecting removal of staying sheets from the proximity of the fixing apparatus.

It is suitable to have means for detecting a type of sheets for printing and change the rotation number of the specific cooling fan inside the main body of the apparatus based on the information on a location of the occurrence of the sheet jam inside the main body of the apparatus and the type of sheets.

According to the present invention, it is possible to switch and control the operation, non-operation and rotation number of the cooling fans inside the apparatus according to a type of medium (sheets) being used and the location of jam occurrence.

Thus, it is possible to optimize the temperature control in the image forming apparatus on the error occurrence and the temperature control of each inside portion of the apparatus on the sheet jam occurrence so as to solve various problems relating to the temperature status in the image forming apparatus on the error occurrence.

To be more precise, in the case where the apparatus proper detects the jam, the means therefor selects the control of the fans inside the apparatus according to the location of jam occurrence, and controls it to be in an optimum status. A plurality of detecting means for detecting the staying sheet in the conveyance route in the apparatus proper are placed so as to identify the location of occurrence in the case where the sheet jam occurs. To describe it by using the aforementioned example for instance, in the case where, based on that information, the user needs to perform the jam handling in the proximity of the fixing apparatus and a difficulty of the handling is expected due to the temperature of the fixing apparatus, the cooling fans placed in the proximity thereof are rotated at a speed faster than usual so that this region is promptly cooled and a thermal obstacle in the jam handling by the user is eliminated.

And it changes the rotation number of the fans again based on the information that the user has eliminated the sheet staying due to the jam, and exerts control to promptly put the apparatus proper in a printable status.

In the case where the jam occurs in a region not related to the fixing apparatus, and in particular, if it is not necessary to quench the proximity of the fixing apparatus, the method of controlling the fans as described above is not adopted.

As described above, in the image formation apparatus capable of checking the error status which occurred in the main body of the apparatus such as the location of sheet jam occurrence, type of sheet and position of the staying sheet, it is possible to optimize temperature management inside the apparatus proper and in the proximity of jam sheet on the error occurrence by adequately controlling the rotation number of the cooling fans placed inside the apparatus according to the positional information on the sheet staying due to the jam and the information on the type of sheet.

BRIEF DESCRIPTION OF THE DRAWINGS

DESCRIPTION OF THE PREFERRED EMBODIMENTS (1) Example of the Image Formation Apparatus FIG. 1 is an overview block diagram of an example of an image formation apparatus according to the present invention. The image formation apparatus in this example is a full-color laser printer of a tandem type using an electrophotographic process and capable of double-side printing. FIG. 2 is an enlarged view of four imaging unit portions of the first to fourth.

Figure 1:
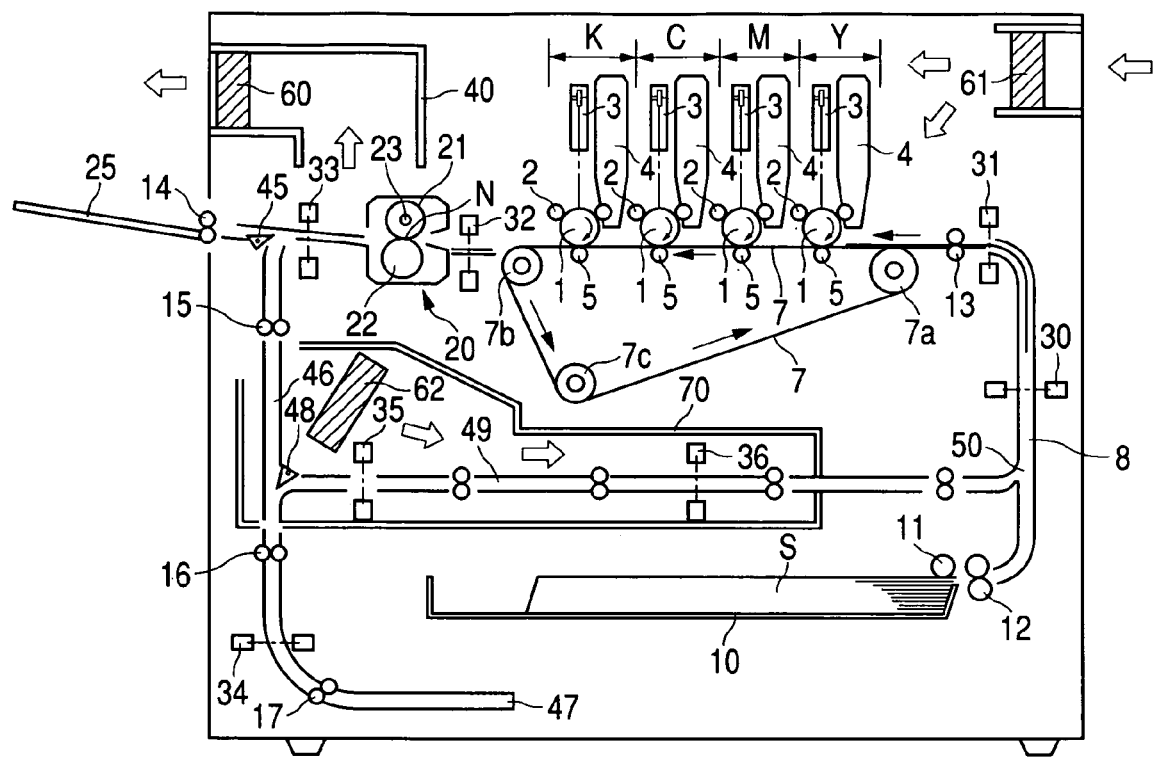
FIG. 1 is an overview block diagram of an example of an image formation apparatus according to the present invention.

Y, M, C and K are the four imaging units of the first to fourth placed in parallel and in order from the left side to the right side on the drawing. Each of the imaging units is an electrophotographic mechanism, and is comprised of a photoconductor drum 1 rotatively driven clockwise as indicated by an arrow, a charging roller 2 for uniformly charging a surface of the photoconductor drum, a laser scanner unit 3 for scanning and exposing the uniformly charged surface of the photoconductor drum with a laser and writing and forming an electrostatic latent image of image information, a developing device 4 for developing the electrostatic latent image formed on the photoconductor drum surface as a toner image and so on.

The first to fourth imaging units Y, M, C and K form a yellow toner image, a magenta toner image, a cyan toner image and a black toner image as three-color decomposition component images of a full-color image respectively on the surface of the photosensitive drum 1 in a mutually predetermined control timing relationship in accordance with image data on each color. As a principle and a process of toner image formation in the imaging units Y, M, C and K are in the public domain, a description thereof will be omitted.

Figure 2:
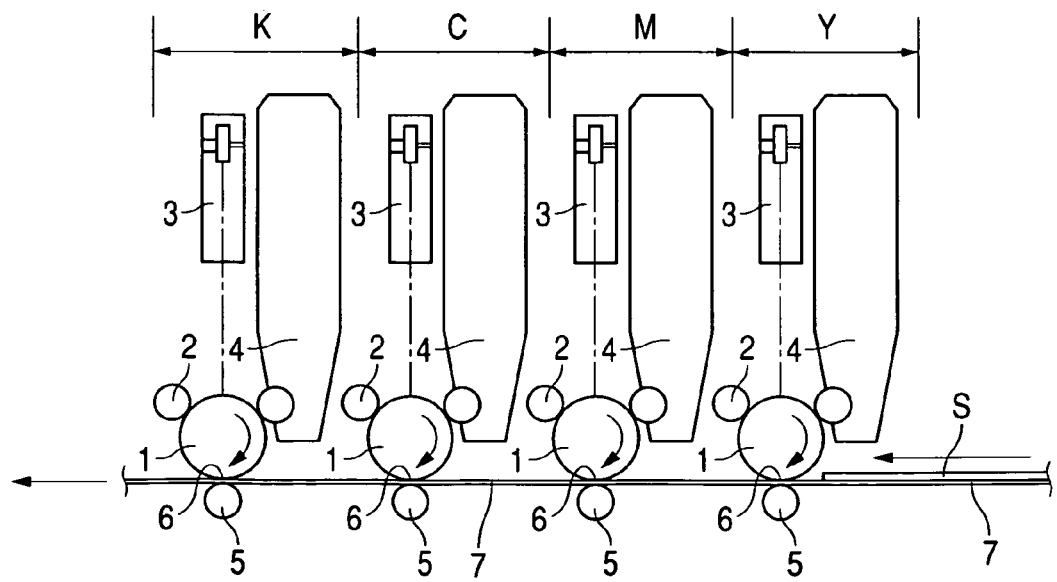
FIG. 2 is a partially enlarged view of FIG. 1.

Reference numeral 7 denotes an endless transfer belt which is run and strained among three supporting rollers 7a, 7b and 7c and rotatively driven counterclockwise as indicated by the arrow. The first to fourth imaging units Y, M, C and K are placed on an upside of a level belt portion between the supporting rollers 7a and 7b of the transfer belt 7 in parallel and in order from the left side to the right side on the drawing. And a transfer belt 8 is put in contact with undersides of the photosensitive drums 1 of the first to fourth imaging units Y, M, C and K by backup rollers (transfer rollers) 5 so as to form transfer points 6 (FIG. 2).

Reference numeral 10 denotes a sheet feeding cassette having sheets S loaded and stored therein. A sheet feed roller 11 is rotatively driven in predetermined control timing based on a print start signal, and a sheet of the sheets S is separated and fed from the sheet feeding cassette 10 to be nipped and conveyed on a conveyance route 8 by pairs of conveyance rollers 12 and 13 so as to be sent to the upside of an ascending belt portion of the transfer belt 7 rotatively driven.

The transfer belt 7 holds the sent sheet S on the upside of the ascending belt portion with electrostatic absorbability or grasps it with a chuck, and conveys it to the transfer points 6 of the first to fourth imaging units Y, M, C and K in order. A predetermined transfer bias is applied to the backup rollers 5 of the transfer points 6 from an unshown transfer bias power supply portion in the predetermined control timing. Thus, the yellow toner image of the first imaging unit Y, the magenta toner image of the second imaging unit M, the cyan toner image of the third imaging unit C and the black toner image of the fourth imaging unit K are sequentially superposed and transferred in an aligned state on the surface of the same sheet S conveyed sequentially to the transfer points 6 of the first to fourth imaging units Y, M, C and K so as to synthesize and form a full-color toner image.

The sheet S having passed through the transfer point 6 of the fourth imaging unit K is separated from the transfer belt 7, and is introduced to a fixing apparatus (hereafter, referred to as a fixing device) 20 to undergo a heating fixing process of an unfixed full-color toner image.

And in the case of single-side printing, the sheet S coming out of the fixing device 20 is ejected on an external catch tray 25 by a pair of ejection rollers 14.

The fixing device 20 in this example is a heat roller type, where the sheet S supporting the unfixed toner image passes through a fixing nip portion N which is a contact point with a fixing roller 21 including a halogen heater 23 and a pressure roller 22 rotating while being crimped to the fixing roller 21 at a predetermined pressure so that the unfixed image is fixed on the sheet S by the heat and pressure.

In the case of double-side printing, the sheet S printed on one side (first surface) coming out of the fixing device 20 is led with its end downward to a conveyance route 46 provided almost vertically by a switching operation of a diverter 45 rotatably placed, and is conveyed inside the conveyance route (path) 46 by pairs of conveyance rollers 15, 16 and 17. Thereafter, when the end of the sheet gets close to a terminal 47 of the conveyance route 46, rotation directions of the conveyance rollers 16 and 17 are reversed so that the sheet is conveyed to be inverted and flow back, and it is led inside a horizontally extended sheet conveyance route 49 by another diverter 48 to be conveyed to the right of the apparatus proper by a plurality of pairs of conveyance rollers. And it joins a conveyance route 8 from the sheet feeding cassette 10 at a junction 50, finishes sheet inversion and starts printing a second surface by using the same procedure as that for the first surface thereafter.

Thus, the image is also printed and fixed on the second surface of the sheet S, and then the sheet is ejected on the catch tray 25.

Only the fourth imaging unit K operates in the case of a monochrome print mode.

Reference numeral 70 denotes a double-sided print unit portion constituted to be detachable from the image formation apparatus proper.

(2) Cooling Fans

Reference numeral 60 denotes a first cooling fan which exhausts hot air generated in the proximity of the fixing device 20 to the outside of the apparatus through a fan duct 40 so as to prevent temperature rise inside the image formation apparatus.

Reference numeral 61 denotes a second cooling fan which is placed on a wall side on the apparatus side opposite to the wall side on the apparatus side on which the first cooling fan 60 is placed. The second cooling fan 61 takes the air outside the apparatus (outside air) into the apparatus and generates an airflow from the first to fourth imaging units Y, M, C and K to the fixing device 20 so as to prevent the hot air from staying in the imaging unit portion.

Reference numeral 62 denotes a third cooling fan which is placed inside the double-sided print unit 70. The third cooling fan 62 generates the airflow from inside the double-sided print unit to outside the double-sided print unit so as to prevent the hot air from staying in the double-sided print unit.

(3) Sheet Detection Sensors

Reference numerals 30 to 36 denote first to seventh sheet detection sensors as sheet jam detecting means and sheet position detecting means in sheet jam condition appropriately placed in the conveyance routes inside the apparatus. These are light transmittance sensors to be used as a pair of a light-emitting side and a light-receptive side which are commonly employed. As a matter of course, there is no problem if they are a combination of a lever member capable of oscillation and a light transmittance sensor which are more commonly employed.

In this example, the first sheet detection sensor 30 is placed at a halfway position in the conveyance route 8 between the pair of conveyance rollers 12 and the pair of conveyance rollers 13, the second sheet detection sensor 31 is placed at a position short of the pair of conveyance rollers 13, the third sheet detection sensor 32 is placed at a sheet inlet side position of the fixing device 20, the fourth sheet detection sensor 33 is placed at a sheet outlet side position of the fixing device 20, the fifth sheet detection sensor 34 is placed at the position between the pairs of conveyance rollers 16 and 17 for switchback conveyance of the conveyance route 46, and the sixth and seventh sheet detection sensors 35 and 36 are placed at an upstream position and a downstream position of the conveyance route portion ahead of the diverter 48 inside the double-sided print unit 70 respectively.

(4) Jam Detection and Cooling Fan Control

The first to seventh sheet detection sensors 30 to 36 detect the timing in which the sheet S passes through each sensor position in the conveyance route from having the sheet S provided from the sheet feeding cassette 10 and having an image printed on the provided sheet in the single-side or double-side printing mode until getting ejected on the catch tray 25.

It is possible, with the sheet detection sensors 30 to 36, to detect a delay in timing of arrival of the sheet in any part or the sheet staying in the sensor portion longer than the predetermined time compared to the status of normal passage of the sheet so as to detect the occurrence of the sheet jam and determine which region of the apparatus proper the sheet is staying in.

Figure 3:
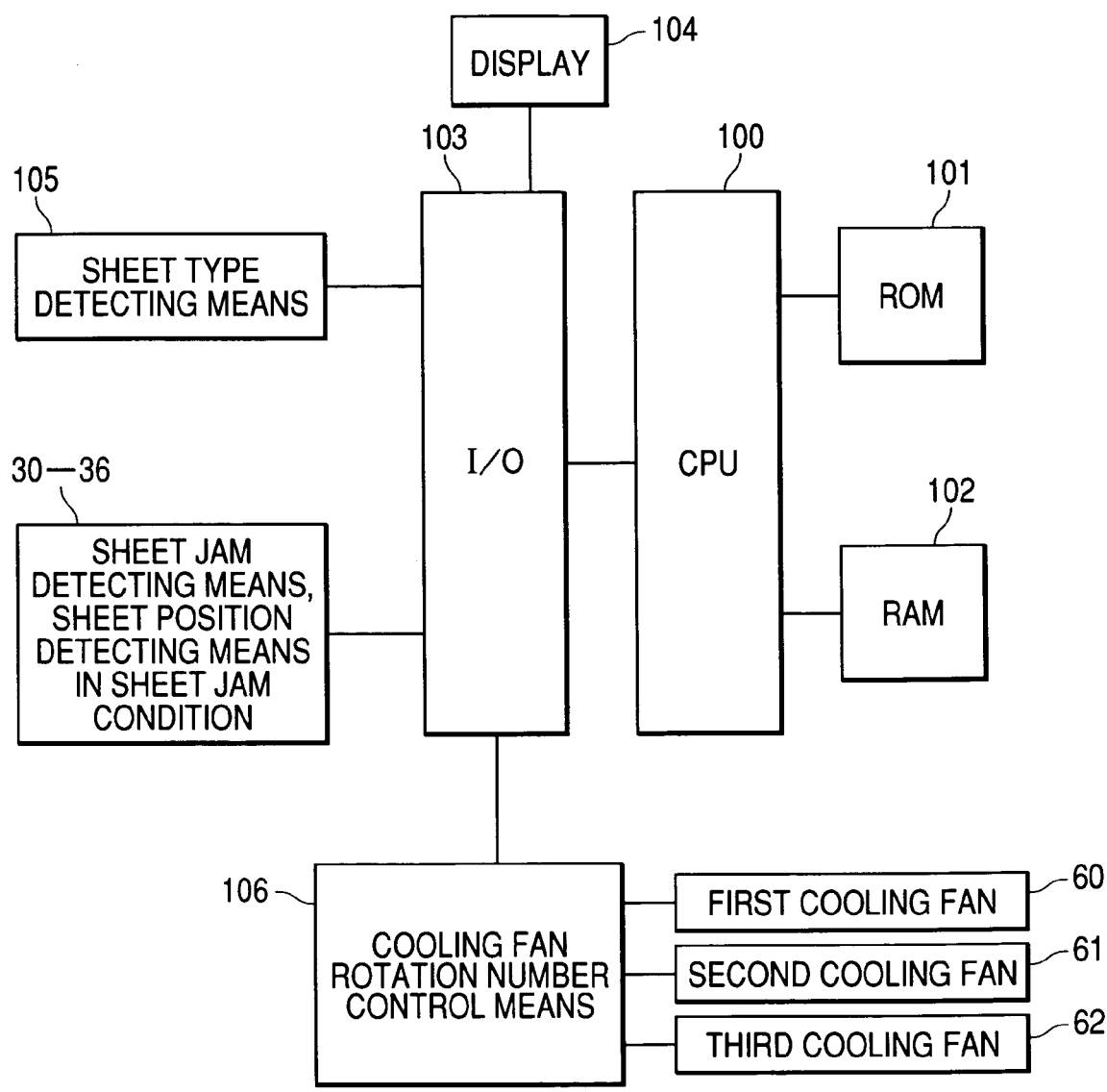
FIG. 3 is a block circuit diagram of a cooling fan rotation number control system.

This jam detection information is sent to a CPU which is a control circuit on an unshown control board inside the apparatus proper, and according to this embodiment, the CPU determines a control method of the cooling fans 60 to 62 placed inside the apparatus proper based on this jam detection information. FIG. 3 shows an example of the control circuit.

To be more specific, such control is possible in a system as shown in FIG. 3 wherein sheet type detecting means 105, the sheet jam detecting means and sheet position detecting means in sheet jam condition (sheet detection sensors) 30 to 36, an input-output (I/O) interface 103, a CPU 100, an ROM 101 and an RAM 102 are combined, and the I/O 103 is connected to cooling fan rotation number control means (a current value change circuit for instance) 106 for controlling the rotation number (rotation al speed) of the cooling fans and is further connected to the cooling fans 60 to 62.

As the conditions are different according to the type of medium, it recognizes the type of medium, such as whether the medium is a regular sheet or an overhead projector transparent sheet (OHT sheet) for instance. Recognition of the type of medium is performed by the sheet type detecting means 105 when conveying the sheet or by using as-is the information inputted from a printer driver when the user provided a print instruction.

The sheet type detecting means 105 (sheet type detecting sensor) is constituted to be able to recognize the type of medium which the user has been using for passage of the sheet on the apparatus from the light transmittance sensors placed inside the apparatus proper or a commonly used technique such as having the sheet type to be used inputted from the printer driver or the like by the user.

1) When the sheet detection sensors 30 to 36 detect the jam or stay of the feed sheets S during execution of an imaging sequence, the CPU 100 stops imaging and sheet conveyance operations of the image formation apparatus in emergency. It displays the jam occurrence and sheet staying position on a display 104. It turns off the energization to the heater of the fixing device 20. It uses the rotation number control means 106 to control the driving of the cooling fans 60 to 62 by switching it from a printing rotation number status to a jam rotation number status determined according to a jam form per rotation number control table in FIG. 1 described later.

2) A jam sheet removal process (jam handling) is performed by the user by opening the release door (not shown) of the image formation apparatus. On opening the release door, a door switch (not shown) is turned off in conjunction with it, and a power circuit of the image formation apparatus is put in a cut-off state so that the image formation apparatus becomes electrically safe for the user. The driving of the cooling fans 60 to 62 stops in conjunction with the cutoff of the power circuit when the release door is opened and the door switch is turned off. The jam handling inside the double-sided print unit 70 is performed by drawing out the double-sided print unit 70 from inside the image formation apparatus.

3) The release door is closed after the jam handling. When the double-sided print unit 70 is drawn out, it is accommodated in the image formation apparatus, and then the release door is closed. On closing the release door, the door switch is turned on in conjunction with it and the power circuit of the apparatus is restored so as to reset the control circuit.

In this case, if there is any unremoved jam sheet or staying sheet still existing in the image formation apparatus, it is detected by the sheet detection sensors 30 to 36. The CPU 100 prohibits a restart of the apparatus, and displays the jam and staying position of the sheet on the display 104 to prompt the user to perform the jam handling again.

If there is no unremoved jam sheet or staying sheet in the image formation apparatus, the sheet detection sensors 30 to 36 do not detect existence of the sheet, that is, detects the removal of all the jam sheets and staying sheets. In this case, the CPU 100 causes a predetermined restart sequential operation of the image formation apparatus to be performed.

Figure 4:
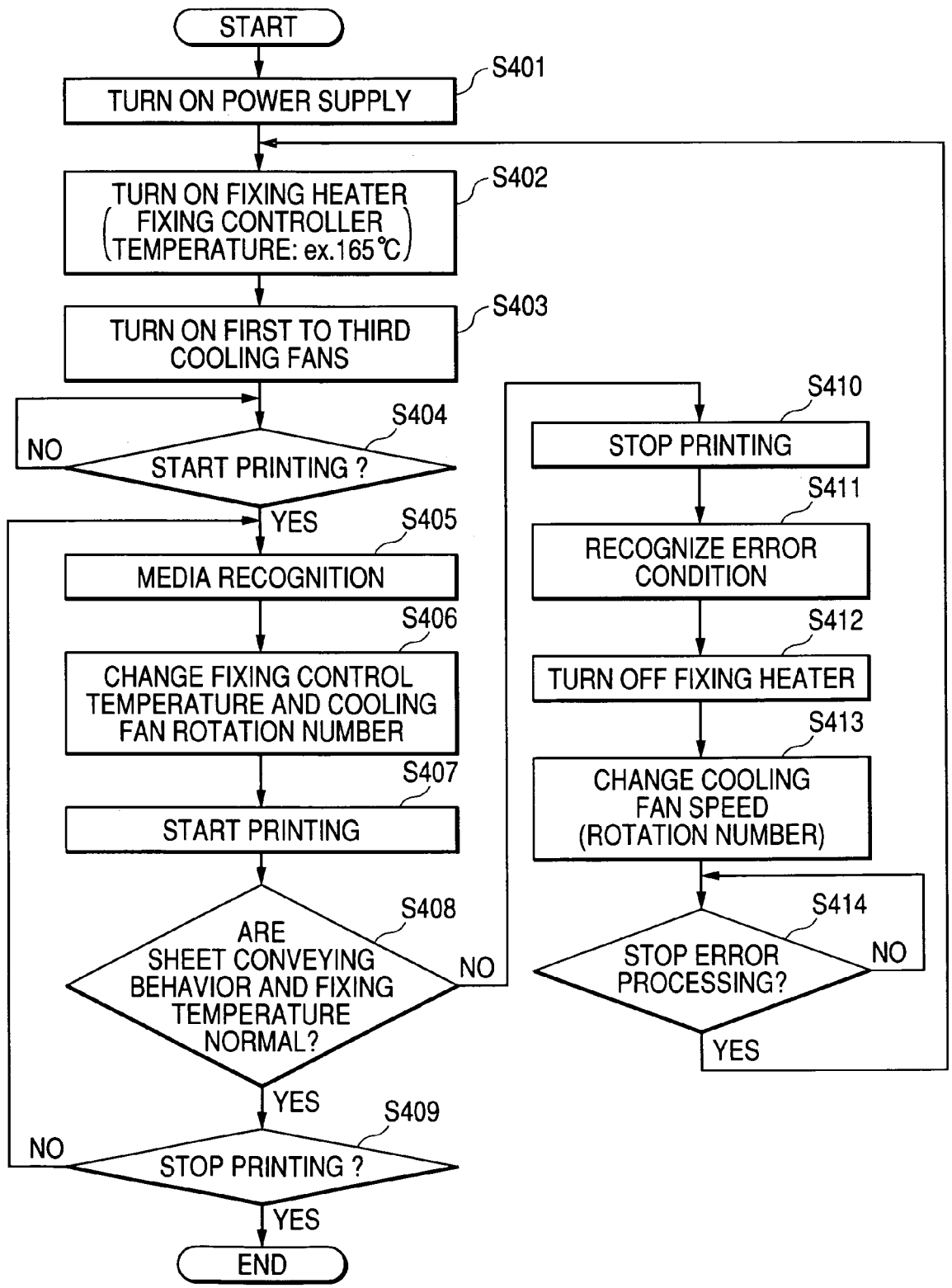
FIG. 4 is an operation and control flowchart of the image formation apparatus according to the present invention.

An example of the fan control is described in FIG. 4 and Table 1.

As for the sequential operation on the restart, a power switch is turned on to start a main motor (S401), the energization to the fixing heater 23 of the fixing device 20 is turned on (S402), and the cooling fans 60 to 62 are driven. The cooling fans 60 to 62 are driven by returning them from a rotation number control status on the jam occurrence to the rotation number control status on standby when normal (set-up condition on standby) (S403).

4) The image formation apparatus is restored to a printable status by performing a predetermined restart sequential operation, and is put in a standby status until the print start signal is inputted. In the standby status, the driving of the main motor is stopped, the fixing device 20 has its temperature controlled at a predetermined standby temperature, and the cooling fans 60 to 62 are driven in the rotation number control status on standby when normal.

5) If the print start signal is inputted (S404), the driving of the main motor is started, the fixing device 20 has its temperature controlled at a predetermined printing temperature, and the cooling fans 60 to 62 are driven in the rotation number control status on printing so as to perform an image creation sequential operation (S406, S407).

In the case where the print start signal has already been inputted while performing the restart sequential operation in the above described 4), on finishing the predetermined restart sequential operation, the driving of the main motor is continuously performed without moving on to the standby status. And the fixing device 20 has its temperature controlled at a predetermined printing temperature, and the cooling fans 60 to 62 are driven by switching to the rotation number control status on printing so as to perform the image creation sequential operation.

Next, a description will be given as to drive control of the cooling fans 60 to 62 on the jam occurrence. It is determined whether or not the sheet conveyance operations and fixing temperature are normal in the above normal sequence (S408). The printing is finished if normal, but the printing operation is stopped if any abnormality is occurring (S410).

Here, an error status is recognized (S411). For instance, in the case where the sheet jam occurs in the proximity of the fixing device 20, that is, in the case where the sheet causes the jam or stays in the region detected by the third sheet detection sensor 32 or the fourth sheet detection sensor 33, the energization to the heater 23 of the fixing device 20 is turned off (S412). And the rotation numbers of the first to third cooling fans shown in Table 1 are changed. For instance, the rotation number of the first cooling fan 60 in the proximity of the fixing device 20 is promptly rendered higher than usual, and the fixing device 20 is thereby cooled as much as possible so as to secure thermal safety and workability for the user on the jam handling in the proximity of the fixing device (S413).

In the case where the sheet jam occurs in the region detectable by the sixth sheet detection sensor 35 or further by the seventh sheet detection sensor 36 in the double-sided print unit 70, the user takes the double-sided print unit 70 out of the apparatus proper and removes the sheet staying inside. When doing so, however, there are the cases where, if the sheet is film-based, it melts by being exposed to the heat of the fixing device 20 for a relatively long time and sticks to the conveyance rollers to become difficult to remove, or feels very hot compared to the regular sheet when the user touches it by hand. In such cases, it is necessary to rotate the third cooling fan 62 placed in the proximity faster than usual so as to cool the medium.

Such medium information is conveyed to a control circuit CPU for controlling the cooling fans by the sheet type detecting means 105, and it thus becomes possible for the apparatus proper to combine both the information on the sheet type being used and the location of jam occurrence and thereby exert more detailed fan control.

To be more specific, during the time after stopping the image creation and sheet conveyance operations of the apparatus in emergency due to the jam detection until opening the release door of the apparatus for the jam handling and turning off the door switch to render the power circuit of the apparatus inoperative, it becomes feasible, only when the film-based sheet gets jammed in the proximity of the fixing device 20 or inside the double-sided print unit 70 as previously mentioned, for the CPU 100 to rotate the first cooling fan 60 or the third cooling fan 62 at a higher rotation number than usual and thereby promote cooling or rotate the first cooling fan 60 still faster than the case of a regular sheet jam and quench it when the film-based sheet gets jammed in the proximity of the fixing device 20.

In the case where the sheet jam occurs in any other part, it is possible, instead of performing such fan control in particular, to exert optimum fan control such as controlling it at the same rotation number as the apparatus on usual standby or controlling it at the rotation number on printing (S413).

TABLE 1

Example of cooling fan control

| Sheet type | Status | Fixing control temperature (° C.) | First cooling fan 60 | Second cooling fan 61 | Third cooling fan 62 |
|---|---|---|---|---|---|
| — | Standby | 165 | 1500 | 1000 | 1000 |
| Regular sheet | Printing | 175 | 2000 | 2000 | 2000 |
| OHT film | Printing | 185 | 2500 | 2000 | 2000 |
| Regular sheet | Jam (no sheet staying in the proximity of the fixing device) *1 | OFF | 2000 | OFF | OFF |
| Regular sheet | Jam (sheets staying in the proximity of the fixing device) *1 | OFF | 3000 | OFF | OFF |
| OHT film | Jam (no sheet staying in the proximity of the fixing device) *1 | OFF | 2000 | OFF | OFF |
| OHT film | Jam (sheets staying in the proximity of the fixing device) *1 | OFF | 3500 | OFF | OFF |
| Regular sheet | Jam (sheets staying in an intermediate unit) *2 | OFF | 2000 | OFF | 3000 |
| OHT film | Jam (sheets staying in the double-sided print unit) *2 | OFF | 2000 | OFF | 3500 |
| Any type | Fixing device temperature control error (abnormal temperature rise) *3 | OFF | 3500 | 3500 | OFF |

*1 No sheet staying in the double-sided print unit
*2 No sheet staying in the proximity of the fixing device
*3 No sheet staying in the double-sided print unit and in the proximity of the fixing device Many image formation apparatuses have the control temperature of the fixing device 20 set differently between standby and printing. There are also many cases where they are optimally selected according to the sheet type. In addition, as an embodiment of the present invention, the control shown in Table 1 has the rotation numbers of the first and third cooling fans optimally set according to the location of jam occurrence (location of paper staying) and the sheet type. Therefore, settings of the fixing temperature and rotational speed of the cooling fans are changed after recognizing the medium. For instance, the settings are changed to those in the case of the regular sheets or the printing conditions of the OHT sheets.

Thus, according to the present invention, the rotation numbers of the plurality of fans and so on inside the apparatus proper are optimally controlled according to the situation of what type of sheet caused the jam in which portion inside the apparatus proper.

This is because, for instance, in the cases of error occurrence such as the jam, rendering the rotation numbers of all the first to third cooling fans 60 to 62 higher leads to a problem of apparatus noise or overcooling the fixing device 20 so that startup time for raising the temperature of the fixing device 20 to the printable status again after the jam handling is unnecessarily extended, which may be dissatisfactory to the user. And it is also because, depending on the sheet type, it is necessary, as previously mentioned, to lower the temperature around the fixing device more promptly than the case of the regular sheets.

As described above, it is possible to optimally control the fans according to the error status of the apparatus, and in particular, the sheet type and the location of sheet jam occurrence in the image formation apparatus having a plurality of sheet detection sensors and a plurality of cooling fans inside the apparatus proper.

(5) Other

The above embodiment illustrated linkage between sheet jam detection and cooling fan control. However, the present invention is not limited to the sheet jam but is also applicable to another error status. Another error is the error in the case where, for instance, a failure occurs in a part of the apparatus during the printing. For instance, there are such cases where, while controlling the temperature of the fixing device, the temperature actually monitored by temperature detecting means rises exceeding a target temperature to be controlled, that is, the cases where the control circuit or sequence gets out of order and the fixing device temperature drastically rises to run away out of control. If a control target temperature is T1 and an actual detected temperature is T2, it results in a temperature difference $\Delta T=T2-T1$. For instance, in the case where this $\Delta T$ becomes +10 degrees C. or more, the apparatus recognizes a fixing device temperature control failure (error). In such cases, to minimize an adverse effect on the apparatus, it is thinkable to take actions such as rotating the first cooling fan 60 in the proximity of the fixing device and the second cooling fan 61 for cooling a drum surrounding temperature at a maximum speed (3500 rpm shown in Table 1 for instance) (however, the third cooling fan is off because the temperature in the double-sided print unit is not directly related).

Various examples and embodiments of the present invention were shown and described above. Those skilled in the art will understand that the gist and scope of the present invention are not restricted by the specific descriptions and drawings in this specification but extends to various modifications and changes totally described in the claims hereof.

What is claimed is:

1. An image formation apparatus comprising:
   a plurality of cooling fans error detecting means for detecting occurrence of an error such as a sheet jam;
   detecting means for detecting a position of at least one residual sheet in a conveyance path in the case that a sheet conveyance error occurs in the apparatus; and
   control means for switching between an operation and non-operation of all the plurality of cooling fans or a specific cooling fan, or switching rotation number of all of said plurality of cooling fans or a specific cooling fan based on positional informational on the at least one residual sheet from said detection means.

2. An image formation apparatus according to claim 1, comprising determination means for determining that the at least one residual sheet which stayed due to the sheet conveyance error in the apparatus has been removed,
   wherein the control means returns rotation control of said cooling fans or the specific cooling fan from a control mode for the sheet error to control mode for standby status or a control mode for a printing status.

3. An image formation apparatus according to claim 1, further comprising:
   a fixing unit for nipping and heating a sheet;
   discriminating means for discriminating an occurrence of a sheet jam or sheet stay in a proximity of said fixing unit,
   wherein, in a case where an occurrence of the sheet jam or sheet stay in the proximity of the fixing unit is recognized by the discriminating, the control means switches the specific cooling fan from non-operation to operation or switches it to a rotational number larger than a rotation number on a control mode for a standby status or a control mode for a printing status.

4. An image formation apparatus according to claim 3, wherein said control means returns said cooling fan to an operating status before the error occurrence on detecting removal of an at least one staying sheet from the proximity of the fixing device.

5. An image forming apparatus comprising:
   a plurality of cooling fans;
   sheet jam detecting means for detecting an occurrence of a sheet jam and detecting a location of the sheet jam occurrence;
   means for detecting a sheet type for printing, and
   control means for changing a rotation number of a specific cooling fan of the plurality of cooling fans based on information on the location of the sheet jam occurrence and the sheet type.

6. An image formation apparatus according to claim 5, comprising determination means for determining that a sheet or sheets which stayed due to the sheet jam occurrence in the apparatus has been removed,
   wherein the control means returns rotation control of said specific cooling fan from a control mode for the sheet jam occurrence to control mode for a standby status or a control mode for a printing status.

7. An image formation apparatus according to claim 5, comprising:
   a fixing unit for nipping and heating a sheet;
   discrimination means for discriminating an occurrence of the sheet jam or sheet stay in the proximity of the fixing unit,
   wherein, in a case where an occurrence of the sheet jam or sheet stay in the proximity of the fixing unit is recognized by the discrimination means, the control means switches the specific cooling fan from non-operation to operation or switches it to a rotation number larger than a rotation number on a control mode for a standby status or a control mode for a printing status.

8. An image formation apparatus according to claim 7, wherein said control means returns said cooling fan to an operating status before the error occurrence on detecting removal of a staying sheet or sheets from the proximity of the fixing unit.

9. An image formation apparatus comprising:
   a plurality of cooling fans error detecting means for detecting occurrence of an error such as a sheet jam;
   a sensor which detects a position of at least one residual sheet in a conveyance path in a case that a sheet conveyance error occurs in the apparatus; and
   a controller for switching between an operation and non-operation of all the plurality of cooling fans or a specific cooling fan, or switching rotation number of all of said plurality of cooling fans or said specific cooling fan based on position information on the at least one residual sheet from said sensor.

10. An image formation apparatus according to claim 9, comprising determination means for determining that a sheet or sheets which stayed due to the sheet conveyance error in the apparatus has been removed,
    wherein said controller returns rotation control of said plurality of cooling fans or the specific cooling fan from a control mode for the sheet conveyance error to a control mode for a standby status or a control mode for a printing status.

11. An image formation apparatus according to claim 9, comprising:
- a fixing unit for nipping and heating a sheet;
- a processor which discriminates an occurrence of the sheet jam or sheet stay in the proximity of the fixing unit,
- wherein, in a case where an occurrence of the sheet jam or sheet stay in the proximity of the fixing unit is recognized by the discrimination means, said controller switches the specific cooling fan from non-operation to operation or switches it to a rotation number larger than a rotation number on a control mode for a standby status or a control mode for a printing status.

12. An image formation apparatus according to claim 11, wherein said controller returns said specific cooling fan to an operating status before the error occurrence on detecting removal of staying sheets from the proximity of the fixing unit.

13. An image formation apparatus comprising:
- a plurality of cooling fans;
- a sheet jam detecting means which detects occurrence of a sheet jam and for detecting a location of of the sheet jam occurrence;
- a sheet type detecting sensor which detects a sheet type for printing; and
- a controller for changing a rotation number of a specific cooling fan of the plurality of cooling fans based on information on the location of the sheet jam occurrence and the sheet type.

14. An image formation apparatus according to claim 13, comprising:
- a sheet detection sensor for determining that a sheet which stayed due to the sheet conveyance error in the apparatus has been removed,
- wherein said controller returns rotation control of said cooling fans from a control mode for the sheet conveyance error to a control mode for a standby status or a control mode for a printing status.

15. An image formation apparatus according to claim 13, comprising:
- a fixing unit for nipping and heating a sheet;
- a sheet detection sensor which discriminates an occurrence of the sheet jam or sheet stay in the proximity of the fixing unit,
- wherein, in a case where an occurrence of the sheet jam or sheet stay in the proximity of the fixing unit is recognized by the sheet detection sensor, the controller switches the specific cooling fan from non-operation or switches it to a rotation number larger than a rotation number on a control mode for a standby status or a control mode for a printing status.

16. An image formation apparatus according to claim 15, wherein said controller returns said specific cooling fan to an operating status before the error occurrence on detecting removal of staying sheets from the proximity of the fixing unit.

\* \* \* \* \*

UNITED STATES PATENT AND TRADEMARK OFFICE
CERTIFICATE OF CORRECTION

PATENT NO. : 6,985,677 B2 Page 1 of 2
APPLICATION NO. : 10/817872
DATED : January 10, 2006
INVENTOR(S) : Yamagata et al.

It is certified that error appears in the above-identified patent and that said Letters Patent is hereby corrected as shown below:

ON THE TITLE PAGE, AT ITEM (57), Abstract:
Line 7, "it-allows" should read --it allows--, and "in-apparatus" should read --the--.
Line 8, "the" should read --in-apparatus--.
Line 11, "in the apparatus" should read --the in-apparatus--.

COLUMN 3:
Line 4, "fans" should read --fan--.

COLUMN 8:
Line 37, "detects" should read --detect--.

COLUMN 11:
Line 42, "fans" should read --fans;--, and "error" should begin a new paragraph.
Line 45, "a" should read --the--.
Line 51, "informational" should read --information--.
Line 59, "for standby" should read --for a standby--.

COLUMN 12:
Line 5, "rotational" should read --rotation--.
Line 16, "and detecting" should read --and for detecting--.
Line 18, "printing," should read --printing;--.
Line 33, "sheet;" should read --sheet; and--.
Line 51, "fans" should read --fans;--, and " error" should begin a new paragraph.

COLUMN 13:
Line 6, "sheet;" should read --sheet; and--.
Line 25, "of" (second occurrence) should be deleted.

UNITED STATES PATENT AND TRADEMARK OFFICE
CERTIFICATE OF CORRECTION

PATENT NO. : 6,985,677 B2
APPLICATION NO. : 10/817872
DATED : January 10, 2006
INVENTOR(S) : Yamagata et al.

It is certified that error appears in the above-identified patent and that said Letters Patent is hereby corrected as shown below:

COLUMN 14:
Line 13, "sheet;" should read --sheet; and--.
Line 21, "non-operation or" should read --non-operation to operation or--.

Signed and Sealed this

Eighth Day of April, 2008

JON W. DUDAS
*Director of the United States Patent and Trademark Office*